Feb. 3, 1931.    S. M. VIALE    1,791,393
GEARING FOR SUPERCHARGERS USED WITH INTERNAL COMBUSTION ENGINES
Filed May 15, 1930
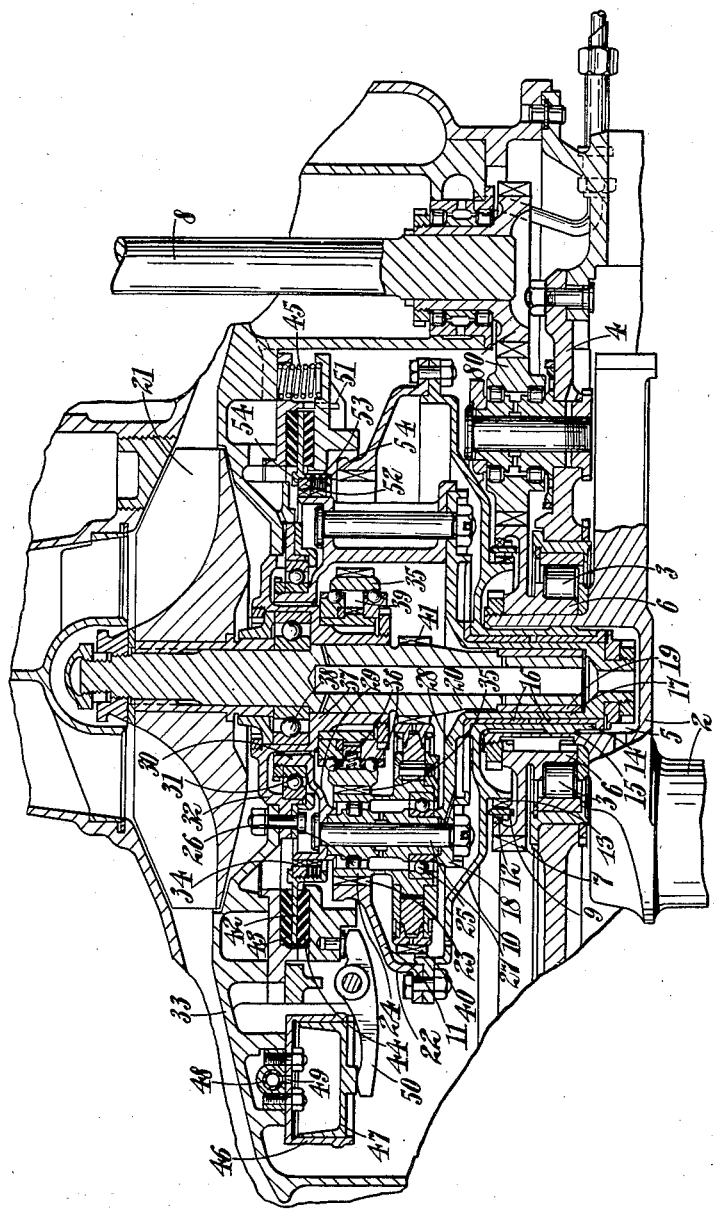
Inventor:
Spirito Mario Viale,
By Mawhinney & Mawhinney,
Attys.

Patented Feb. 3, 1931

1,791,393

UNITED STATES PATENT OFFICE

SPIRITO MARIO VIALE, OF COVENTRY, ENGLAND, ASSIGNOR TO ARMSTRONG SIDDELEY MOTORS LIMITED, OF COVENTRY, ENGLAND, A BRITISH COMPANY

GEARING FOR SUPERCHARGERS USED WITH INTERNAL-COMBUSTION ENGINES

Application filed May 15, 1930, Serial No. 452,702, and in Great Britain June 20, 1929.

This invention relates to the epicyclic gearing used for driving superchargers of internal-combustion engines, and particularly of those of the type known as "stationary radial" engines such as are used on aircraft.

In certain circumstances the speed of the supercharger requires to be very high in relation to the engine speed, whilst in normal conditions the desired gear ratio is much lower. The object of the present invention is to comply with the required conditions by introducing a two-speed gear between the engine crankshaft and the supercharger spindle which will be of small weight and be compact and yet be little likely to fail.

According to this invention, the gearing consists of an epicyclic train comprising a driving internally-toothed annulus, a compound pinion on a carrier which can be held or freed, a driven sun pinion connected with the blower spindle and driven from the larger member of the compound pinion, and a clutch-controlled sun pinion which can be held or freed and which meshes with the smaller member of the compound pinion with which the annulus also meshes.

Preferably the clutch-controlled sun pinion is mounted upon a stationary part with which it is connected through an over-running or freewheel clutch, so that the sole control device consists of the means for holding the planet pinion carrier stationary.

In the accompanying drawings,

The single figure is a central axial section through an impeller and epicyclic gearing therefor according to the invention.

In the construction illustrated, the engine crankshaft 2 is supported on the side adjacent to the supercharger in bearings 3 in a crank chamber wall 4, and the shaft there supported is bored out as at 5. Fitted upon the outside of the crankshaft, and in the same radial plane as the crank chamber wall, is a driving member 6 the periphery of which is formed with gear teeth 7 for driving through gears 80, 80, one or more shafts 8 carrying auxiliaries such as magnetos, etc.

This driving member 6 is connected by a flexible driving coupling 9 with part 10 of an internally toothed annulus 11. The flexible coupling consists of two toothed members meshing through a loose or an elastic connection 9, and the teeth 12 on the driving member 6 are on the side thereof remote from the crank chamber and are radial. Those 13 on the part 10 of the annulus are on the side of it adjacent to the crank chamber and are also radial.

This part 10 of the annulus is integral with a sleeve portion 14 which projects into the bore 5 of the crankshaft and has a clearance therein, except for a rounded or other surface 15 which bears against the wall of the bore in the plane of the crankshaft bearings 3 to avoid the ill effects of crankshaft whip. The sleeve contains one or more bushes 16 which can run freely upon a part 17 of the planet pinion carrier 18 which lies within it and which in turn runs upon a floating bush 19 upon the end of the spindle 20 of the supercharger blower or impeller 21.

Thus the internally-toothed annulus 11 is well supported in the plane of the crankshaft bearings.

Bolted to the part 10 of the annulus is an internally-projecting flange 22 the inner periphery of which is formed with the internal teeth 23 which constitute the driving element of the epicyclic gear. These mesh with the smaller members 24 of compound planet pinions, of which there may be three, mounted upon ball and roller bearings 25, 26 on bolts 27 connecting together the two discs 28, 29 of a two-part planet pinion carrier 18. The disc 28 adjacent to the crank chamber is integral with the sleeve 17 which lies between the sleeve 14 on the annulus 11 and the impeller spindle 20. The other disc 29 is provided with a hub portion 30 projecting away from the crank chamber and supported by a ball bearing 31 from a cover plate or casing member 32 enclosing the gearing, which forms the back wall 33 of the supercharger. These two parts of the planet pinion carrier are well supported at points far apart.

The disc 29 of the carrier 18 is extended radially outwards and formed as a brake member, as hereinafter described.

Of the compound pinions the smaller members 24 are, as stated, driven by the annulus 11, but they also drive on to a sun wheel 35, which consists of a toothed ring mounted upon a ball bearing 36, 36 at each side upon a stationary tubular carrier 37 fixed to the back wall of the supercharger and internally supporting, by a ball bearing 38, the blower spindle 20. Between this sun pinion ring and its stationary support is an over-running clutch device 39, such as a ratchet and pawl.

The larger elements 40 of the compound planet pinions may contain centrifugally-controlled clutches and they gear with a driven sun pinion 41 on the blower spindle.

During the greater part of the running of the engine, the blower is only required to run at a comparatively low speed, say, five times that of the engine crankshaft. At such times the brake on the carrier 18 is released and the power then passes through the annulus 11, planet pinions, to the driven sun 41 on the blower spindle, the carrier 18 revolving about the then fixed sun pinion 35, which tends to revolve in the direction prevented by the one-way clutch.

When it is desired to increase considerably the delivery from the supercharger, the brake is applied to hold the carrier 18 stationary, and the power then passes from the annulus 11 to the smaller members of the planet pinions, revolving these pinions about their own axes at a very high speed. The larger of the pinions in turn drive the blower spindle through the driven sun 41 at a further increased speed, so that a very high gearing-up can be obtained, say a ratio of 13 to 1.

A method of operating the carrier brake hydraulically is shown in the drawing, where the carrier 18 is formed with the brake disc 42 disposed between the fixed friction element 43 and the axially-movable friction element 44. The latter is spring-pressed inwardly by seven angularly-disposed springs of which only one, 45, is shown. Interposed between the adjacent springs are seven hydraulic operating means, comprising cylinders 46 and pistons 47. The liquid supply, which may be obtained from any convenient source, for example, from the engine lubrication system, is led to the pipe 48 communicating with all the cylinders by passages 49.

Thus, when the pilot turns on the liquid supply, the pistons 47 are pushed outwardly, and through rocking levers 50 the movable friction element 44 is urged against the brake disc 42, to cause it to be held. When the pilot releases the pressure the release springs 45 return the friction plate 44 until the pistons 47 reach the inner ends of the cylinders.

It will be understood that the movable friction element 44 is held against rotation. For this purpose the casing adjacent to the fixed friction element may be formed with longitudinal fingers such as 51 engaging corresponding recesses in the movable element 44. To allow of limited axial movement when the brake disc 42 is being held, the same has a toothed connection with the main portion of the carrier, as shown at 34.

In order to prevent a back fire, when starting the engine, from operating the supercharger with the brake disc held, this toothed connection involves an annulus 52 threaded in the hub 53 of the brake disc, the hub being elongated and provided with the end stops 54. Thus, a back fire merely operates to unscrew the annulus 52 from the driving end stop towards the other stop. This lost motion will be immediately picked up when the engine runs.

It should be noted that the main portion of the gearing is located at the impeller end from the back wall 33. In manufacture, these parts are all fitted to one another and then dropped into the hollow end 5 of the crankshaft.

It will be seen that, for the greater part of the running, the gearing operates in a very simple manner and therefore there is little wear and tear. Also the gearing is of light weight and takes up little room.

What I claim as my invention and desire to secure by Letters Patent of the United States is:—

1. Epicyclic gearing for driving the supercharger of an internal combustion engine, comprising a driving shaft, a toothed member connected with said shaft, a second toothed member, a flexible connection between said toothed members including an annulus with internal and external teeth, an internally-geared annulus attached to said second toothed member, a planet pinion driven from said annulus, a carrier member supporting said planet pinion, a sun pinion meshing with said planet pinion and a blower spindle connected to said sun pinion.

2. For an internal combustion engine of the "stationary radial" type, the combination of a driving shaft, an axial bore in said shaft, a spindle having one end supported in said axial bore, a supercharger blower mounted at the opposite end of said spindle, a member connected to said driving shaft and surrounding said spindle, internal gear teeth on said member, a planet pinion meshing with said gear teeth, a carrier for said planet pinion coaxial with said spindle, a sun pinion geared to said planet pinion and driving said spindle, and a casing enclosing all said parts and providing bearings therefor, said casing also forming one wall of the chamber for said blower.

3. Epicyclic gearing comprising a driving shaft having a hollow portion, an internally-toothed annulus connected to said shaft, said annulus being formed with a sleeve which extends into said hollow portion, a compound planet pinion driven from said annulus, a carrier supporting said planet pinion, means for selectively holding and releasing said carrier, a clutch-controlled sun pinion meshing with the smaller member of said planet pinion, a second sun pinion driven from the larger member of said planet pinion, and a spindle driven by said second sun pinion.

4. Epicyclic gearing comprising a driving shaft having a hollow portion, an internally toothed annulus connected to said shaft, said annulus being formed with a sleeve which extends into said hollow portion, said sleeve having a raised surface engaging said hollow portion, an external bearing for said hollow portion substantially coplanar with said raised surface, a compound planet pinion, driven from said annulus, a carrier supporting said planet pinion, means for selectively holding and releasing said carrier, a clutch-controlled sun pinion meshing with the smaller member of said planet pinion, a second sun pinion driven from the larger member of said planet pinion, and a spindle driven by said second sun pinion.

5. Epicyclic gearing comprising a driving shaft having a hollow portion, an internally toothed annulus connected to said shaft, said annulus being formed with a sleeve which extends into said hollow portion, a compound planet pinion driven from said annulus, a carrier supporting said planet pinion, said carrier being formed with a sleeve which extends into the sleeve of said annulus, means for selectively holding and releasing said carrier, a clutch-controlled sun pinion meshing with the smaller member of said planet pinion, a second sun pinion driven from the larger member of said planet pinion, and a spindle driven by said second sun pinion.

6. Epicyclic gearing comprising a driving shaft having a hollow portion, an internally toothed annulus connected to said shaft, said annulus being formed with a sleeve which extends into said hollow portion, a compound planet pinion driven from said annulus, a carrier supporting said planet pinion, said carrier being formed with a sleeve which extends into the sleeve of said annulus, a bush disposed between said sleeves, means for selectively holding and releasing said carrier, a clutch-controlled sun pinion meshing with the smaller member of said planet pinion, a second sun pinion driven from the larger member of said planet pinion, and a spindle driven by said second sun pinion.

7. Epicyclic gearing comprising a driving shaft having a hollow portion, an internally toothed annulus connected to said shaft, said annulus being formed with a sleeve which extends into said hollow portion, a compound planet pinion driven from said annulus, a carrier supporting said planet pinion, said carrier being formed with a sleeve which extends into the sleeve of said annulus, means for selectively holding and releasing said carrier, a clutch-controlled sun pinion meshing with the smaller member of said planet pinion, a second sun pinion driven from the larger member of said planet pinion, and a spindle driven by said second sun pinion, said spindle extending within the sleeve of said carrier.

8. Epicyclic gearing comprising a driving shaft having a hollow portion, an internally toothed annulus connected to said shaft, said annulus being formed with a sleeve which extends into said hollow portion, a compound planet pinion driven from said annulus, a carrier supporting said planet pinion, said carrier being formed with a sleeve which extends into the sleeve of said annulus, means for selectively holding and releasing said carrier, a clutch-controlled sun pinion meshing with the smaller member of said planet pinion, a second sun pinion driven from the larger member of said planet pinion, a spindle driven by said second sun pinion, said spindle extending within the sleeve of said carrier, and a floating bush between said spindle and the adjacent sleeve.

9. Epicyclic gearing comprising a driving shaft having a hollow portion, a gear member connected to said shaft, a sleeve on said gear member adapted to extend into said hollow portion, a compound planet pinion driven from said member, a carrier for said pinion, means for selectively holding and releasing said carrier, a sun pinion meshing with said planet pinion, automatic means for holding and freeing said sun pinion, a second sun pinion driven from said planet pinion, and a spindle driven by said second sun pinion.

In testimony whereof I affix my signature.

SPIRITO MARIO VIALE.